United States Patent
Sendoda

(10) Patent No.: US 8,472,173 B2
(45) Date of Patent: Jun. 25, 2013

(54) ELECTRIC APPARATUS

(75) Inventor: Mitsuru Sendoda, Tokyo (JP)

(73) Assignee: NEC Corporation, Tokyo (JP)

( * ) Notice: Subject to any disclaimer, the term of this patent is extended or adjusted under 35 U.S.C. 154(b) by 98 days.

(21) Appl. No.: 13/146,146

(22) PCT Filed: Jan. 28, 2010

(86) PCT No.: PCT/JP2010/000517
§ 371 (c)(1),
(2), (4) Date: Jul. 25, 2011

(87) PCT Pub. No.: WO2010/087186
PCT Pub. Date: Aug. 5, 2010

(65) Prior Publication Data
US 2011/0279954 A1  Nov. 17, 2011

(30) Foreign Application Priority Data
Jan. 28, 2009 (JP) .............................. P2009-016779

(51) Int. Cl.
*H05K 5/00* (2006.01)
*H05K 7/00* (2006.01)

(52) U.S. Cl.
USPC ............. 361/679.16; 361/679.1; 361/679.11; 361/679.12; 361/679.13; 361/679.14; 361/679.15

(58) Field of Classification Search
USPC ............... 361/679.1, 679.11, 679.12, 679.13, 361/679.14, 679.15, 679.16
See application file for complete search history.

(56) References Cited

U.S. PATENT DOCUMENTS

| | | | | |
|---|---|---|---|---|
| 6,798,649 | B1 * | 9/2004 | Olodort et al. | 361/679.13 |
| 6,983,175 | B2 * | 1/2006 | Kwon | 455/575.1 |
| 7,153,050 | B2 * | 12/2006 | Liu et al. | 400/682 |
| 7,764,489 | B2 * | 7/2010 | Kim et al. | 361/679.16 |
| 7,911,773 | B2 * | 3/2011 | Eromaki et al. | 361/679.16 |
| 8,072,427 | B2 * | 12/2011 | Pletikosa et al. | 345/169 |
| 2003/0013417 | A1 | 1/2003 | Bum | |
| 2003/0048596 | A1 * | 3/2003 | Hsieh et al. | 361/680 |
| 2003/0099086 | A1 * | 5/2003 | Chuang | 361/680 |
| 2005/0195576 | A1 | 9/2005 | Chuang | |
| 2013/0027865 | A1 * | 1/2013 | Ge et al. | 361/679.16 |

FOREIGN PATENT DOCUMENTS

| | | |
|---|---|---|
| CN | 1719840 | 1/2006 |
| EP | 1881682 | 1/2008 |
| JP | 04-157517 | 5/1992 |
| JP | 05-120954 | 5/1993 |
| JP | 5-211464 | 8/1993 |

(Continued)

OTHER PUBLICATIONS

Extended European Search Report dated Sep. 27, 2012 with English translation; Application No. 10735658.6.

(Continued)

*Primary Examiner* — Anthony Haughton
(74) *Attorney, Agent, or Firm* — Young & Thompson

(57) ABSTRACT

An electric apparatus is provided in which it is possible to connect a signal line to multiple key panels which are rotatably attached to a main body chassis. The electric apparatus has multiple first hinges and multiple second hinges. The first hinge rotatably attaches a panel to the second hinge. Further, the second hinges are rotatably attached to a main body of the electric apparatus. The multiple second hinges are rotatably connected.

14 Claims, 9 Drawing Sheets

FOREIGN PATENT DOCUMENTS

| | | |
|---|---|---|
| JP | 08-147246 | 6/1996 |
| JP | 2000-013047 | 1/2000 |
| JP | 2003-348200 | 12/2003 |
| JP | 2006-064000 | 3/2006 |
| JP | 2006-093461 | 4/2006 |
| JP | 2008-271352 | 11/2008 |

OTHER PUBLICATIONS

International Search Report, PCT/JP2010/00517, Apr. 27, 2010.
Chinese Official Action—201080005643.5—Feb. 16, 2013.

* cited by examiner

ELECTRIC APPARATUS

BACKGROUND OF THE INVENTION

1. Technical Field

The present invention relates to a connection constitution of signal lines of an electric apparatus and particularly relates to an electric apparatus which has a connection constitution including a multi-stage hinge.

Priority is claimed on Japanese Patent Application No. 2009-016779, filed Jan. 28, 2009, the content of which is incorporated herein by reference.

2. Background Art

For an electric apparatus such as a mobile terminal, various kinds of numeric data and character data input via key operations are necessary, for example, numeric characters, alphabet, Japanese Kana characters and Chinese characters. Due to such a precondition, such an electric apparatus conducts conversion operations by using each key to which multiple key functions are assigned, and therefore, operations of the electric apparatus are complex. Therefore, an electric apparatus having multiple key panels has been desired to improve operability.

On the other hand, a mobile electric apparatus is required to be small, thin and light so as to be convenient for carrying. Due to such a requirement, an electric apparatus having a stowaway key panel is provided. However, in a case of the stowaway key panel, there is a problem of a connection constitution of signal lines at a hinge portion.

For example, a connection constitution of signal lines disclosed in Patent Document 1 has a cavity portion inside a hinge portion of a cellular phone which is a flip phone, and wirings are arranged inside the cavity portion to have electrical connection between the chassis. In a concrete case, as shown in FIG. 9, a first chassis 901 including a display portion and a second chassis including a key operation portion, for example, buttons are rotatably connected to each other via a hinge portion 903. In a cavity portion 905 formed along a rotation axis of the hinge portion 903, a line 904 electrically connects both the first chassis 901 and the second chassis 902. The line 904 has a spiral portion 904a which has a curled shape to prevent damage, for example, breaking of the line due to open/close operations of the first chassis 901 and the second chassis 902 (see Patent Document 1).

In such a prior technique, a diameter of the spiral portion 904a is changed so as to absorb stretch of the line 904 due to open/close operations of the first chassis 901 and the second chassis 902. In other words, a countermeasure of breaking of the line is applied to ease the stress which is caused on the line 904 upon open/close operations. In general, for example a cable and a flexible substrate are applied to the line 904. Particularly, the flexible substrate has fine wiring patters formed on a film material and has flexibility, and therefore, the flexible substrate is preferred and used for arranging the line 904 inside a limited space, for example, the hinge portion 903. In other words, for example, when the first chassis 901 and the second chassis 902 are rotated around the hinge portion 903, a shape of the above-described flexible substrate can be modified or curved to some extent in accordance with such rotation, and it is possible to provide a countermeasure for breaking of the line 904.

Further, in a hinge constitution including a pair of parallel axes described in Patent Document 2, a hinge portion 903 is set between a first chassis 901 and a second chassis 902 as shown in FIGS. 10A and 10B. A line 904 connects the chassis 901 and the chassis 902 while passing through the hinge portion 903. For example, a discrete line or a fine coaxial line is used as such a line 904. Particularly, a fine coaxial line accepts curves with various angles and changes shapes in accordance with rotation of the first chassis 901, second chassis 902 and the hinge portion 903 that are connected, and therefore, it is possible to provide a countermeasure for breaking of the line 904.

Further, in a constitution of a hinge portion of a mobile terminal described in Patent Document 3, a cylindrical shape portion is included in each of chassis that are connected by using a hinge. While the cylindrical shape portions are combined, both a hinge unit and a support portion are inserted from one end, and the hinge portion is constituted in such a manner. Further, notch portions are provided which, when the cellular phone is opened, appear on surfaces of the same side, and a path through which a flexible printed substrate is lead is formed when the notch portions face each other. Such a hinge portion constitution described in Patent Document 3 is generally known as a hinge portion of a cellular phone in which a line is lead through the hinge portion formed by a portion of the chassis, and not lead inside a hinge.

[Patent Document 1] Japanese Patent Application, First Publication No. 2006-93461

[Patent Document 2] Japanese Patent Application, First Publication No. 2006-64000

[Patent Document 3] Japanese Patent Application, First Publication No. 2008-271352

[Patent Document 4] Japanese Patent Application, First Publication No. H05-211464

SUMMARY OF THE INVENTION

However, as shown in FIGS. 1A and 1B, a connection method of a signal line described in Patent Document 1 has a problem in which it is not possible to connect signal lines to multiple panels that are rotatably connected to the chassis. This is because Patent Document 1 has a concept in which the rotatable chassis 901 and 902 are arranged at both ends while supporting each other so as to constitute a cavity portion 905 of a divided hinge portion 903 as shown in FIG. 9. In accordance with such a concept, two portions are a limitation when dividing the chassis, and it is not possible to successively arrange multiple key panels around a rotation axis while connecting a signal line to each key panel.

Further, it is similar to Patent Document 1, a connection constitution of a signal line using a pair of parallel axes described in Patent Document 2 has a problem in which it is not possible to connect signal lines to multiple panels. Regarding such a problem, as shown in FIGS. 10A and 10B, the hinge portion 903 has a portion at which the line 904 is arranged is at one side of the hinge portion 903. Between only two chassis, it is possible to connect the hinge portions 903, and it is possible to connect the line 904. This is because, the chassis that can be rotatably connected as shown in FIGS. 10A and 10B are only the first chassis 901 and the second chassis 902 that have portions connected to the hinge portion 903.

Further, the hinge portion constitution described in Patent Document 3 relates to an arrangement of a signal line for connecting a pair of chassis by using a hinge, and it is not possible to connect multiple key panels by using a hinge.

The present invention relates to a connection method of signal lines of an electric apparatus. Further, the present invention has an object to provide an electric apparatus having multiple key panels that are rotatably connected by using a multi-stage hinge while being connected to the signal lines.

In view of achievement of the above described object, an electric apparatus of the present invention has multiple key panels with operation surfaces on which keys are arranged facing in one direction, wherein one end of each of said multiple key panels is connected to a terminal main body via both a first hinge which has a rotatable connection and a second hinge which is in parallel with the first hinge and which has a rotatable connection, said multiple key panels have a constitution in which the second hinges are arranged in a line along a direction of a rotation central axis thereof, and a signal line which transmits operation information from the terminal main body to each of said multiple key panels, pierces the hollow rotation central axis of the second hinges, is divided at a point corresponding to the first hinge of each of said multiple key panels, and is connected to both the first hinge and an inside portion of a chassis of each of said multiple key panels via a notch portion on a rotation central axis cylindrical portion of the second hinge that is arranged at a point corresponding to the first hinge.

In accordance with the present invention, it is possible to provide an operation panel corresponding to each multiple function of an electric apparatus, it is possible to reduce the number of operation keys arranged on the operation panel, and it is possible to improve operability because useless keys are omitted. On a key area having a fixed size, if the number of keys is reduced, each key can be comparatively large, and therefore, there is an advantage in which it is possible to improve usability. Further, by using an application program which switches functions in accordance with the rotation of the operation panels, it is possible to introduce an easy and understandable user interface in which functions are switched by a physical operation.

An object to provide an electric apparatus is realized in which signal lines can be connected while multiple key panels are rotatably connected to a hinge in a multi-stage manner, and in which multiple key panels are provided so as to be stowaway key panels.

DETAILED DESCRIPTION OF THE INVENTION

Embodiment 1

Figure 1A:
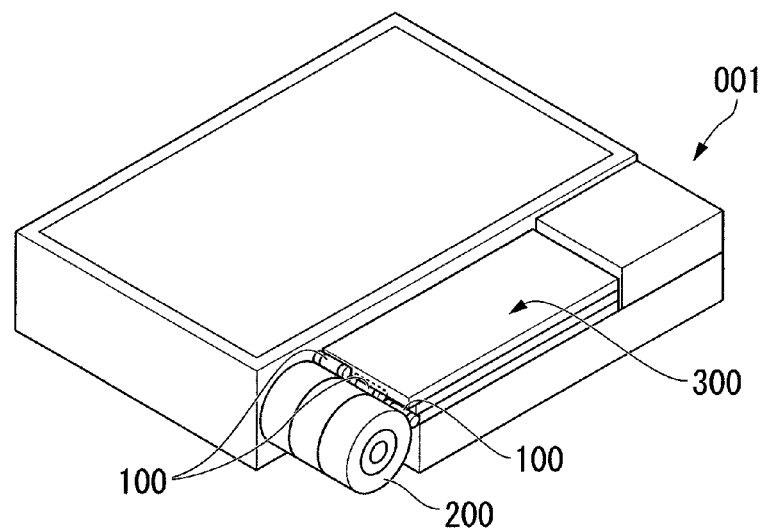
FIG. 1A is a drawing showing a constitution of an electric apparatus of one embodiment of the present invention.
Figure 1B:
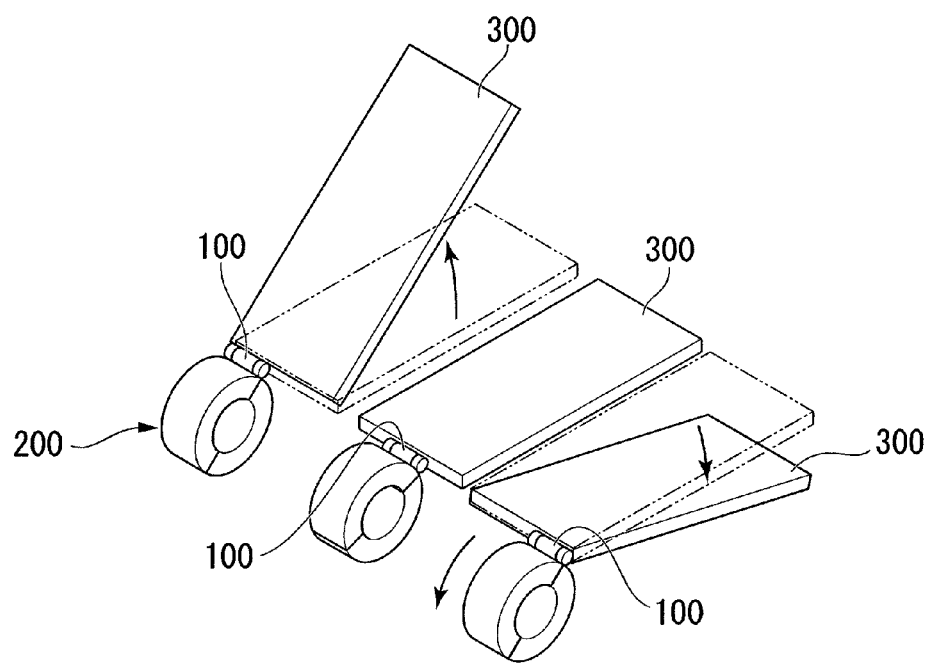
FIG. 1B is a drawing showing a constitution of an electric apparatus of one embodiment of the present invention.

Hereinafter, an embodiment of the present invention is explained in detail in reference to the drawings. FIGS. 1A and 1B are drawings showing a constitution of an electric apparatus of one embodiment of the present invention. First hinges 100 are rotatably connected to the end of multiple key panels 300. The key panels 300 are connected to a terminal main body 001 via both the hinges 100 and second hinges 200 which are rotatably connected in parallel with the hinges 100. Further, the multiple key panels 300 (three panels in the drawings) are sequentially arranged along a rotation axis of the second hinges 200 in a manner in which the multiple panels (three panels in the drawings) overlap.

Figure 2:
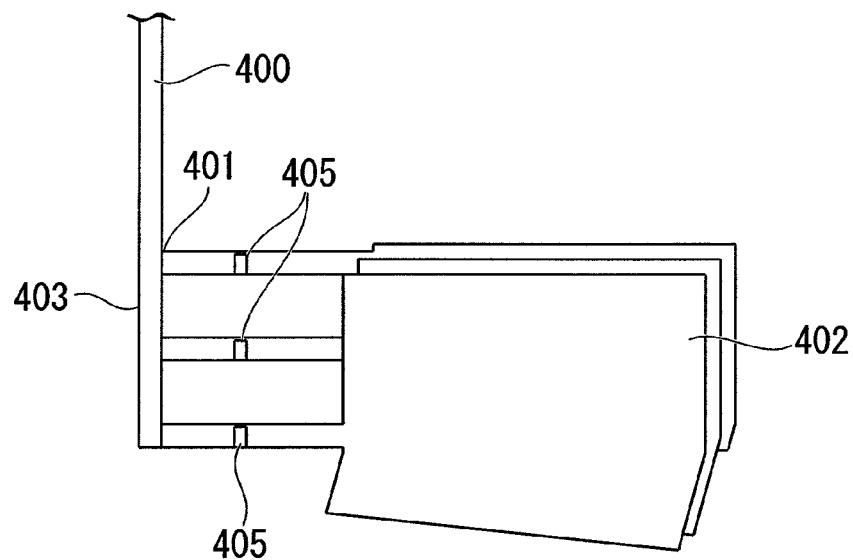
FIG. 2 is a drawing showing a constitution of an unfolded signal line of one embodiment of the present invention.

Hereinafter, in reference to FIGS. 2-5, an arrangement constitution is explained between the first hinges 100 and second hinges 200 that connect the key panels 300 to the terminal main body 001 and signal line 400. FIG. 2 is a developed figure of signal line 400. For example, a flexible cable is applied to the signal line 400. A portion labeled "MAIN BODY SIDE" in the drawings is lead out of the substrate which is installed in the terminal main body 001 by using, for example, a connector (not shown in the drawings). The signal line 400 is divided at a division portion 401 corresponding to the second hinge 200 to which the multiple key pad 300 is connected. At an end point which is divided from the signal line 400, a wiring pattern (not shown in the drawings) is formed which detects key operations on the key panel 300. In general, the key panel 300 is formed on one flexible substrate by laminating. Therefore, it is not possible to form a wiring pattern portion 402 for detecting key operations by simply using the flexible cable shown in FIG. 2. There is an example of such a formation in which three signal lines corresponding to the key panels 300 are formed, and the signal lines are integrated at a connection portion 403 which connects to the terminal main body 001. There is another method in which the wiring pattern portions 402 which are laminated are formed as independent pieces, and by using an ACF adherence, the wiring pattern portions 402 are connected at the connection portion 403 which is connected to the terminal main body 001. Further, there is a method in which the wiring pattern portion 402 is folded in a manner which is similar to Origami (decorative objects made by folding paper), and in which the wiring pattern portion 402 is formed so as to be divided when being unfolded. These methods are general knowledge for a person skilled in the art and are not described in detail.

Figure 3:
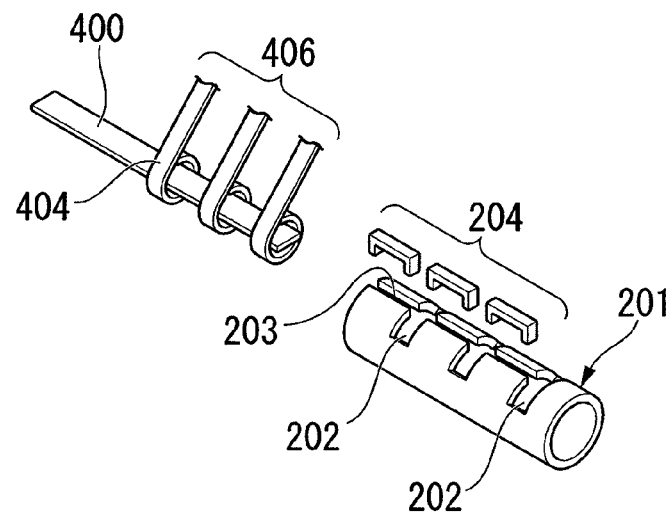
FIG. 3 is a drawing showing a constitution of an arrangement of signal lines of one embodiment of the present invention.

FIG. 3 shows a constitution of the signal line 400 arranged inside a hollow rotation central axis 201 of the second hinges 200. The hollow rotation central axis 201 has a cylindrical shape and has notch portions 202 formed at predetermined intervals. Further, a slit 203 is formed in a direction perpendicular (along axis) to each notch portion 202, and a spacer 204 is attached to the slit 203. The signal line 400 is arranged inside the hollow rotation central axis 201, and divided lines 406 are lead out of the notch portions 202. In the drawings, the wiring pattern portions 402 are omitted which are laminated and detect key operations. A winding portion 404 is formed to follow a rotation of the second hinge 200 at the signal line 400 which is divided from the division portion 401 as shown in FIG. 3 and which is lead toward each key panel 300. The winding portion 404 is conventionally used to electrically connect two chassis of a stowaway cellular phone.

Figure 4A:
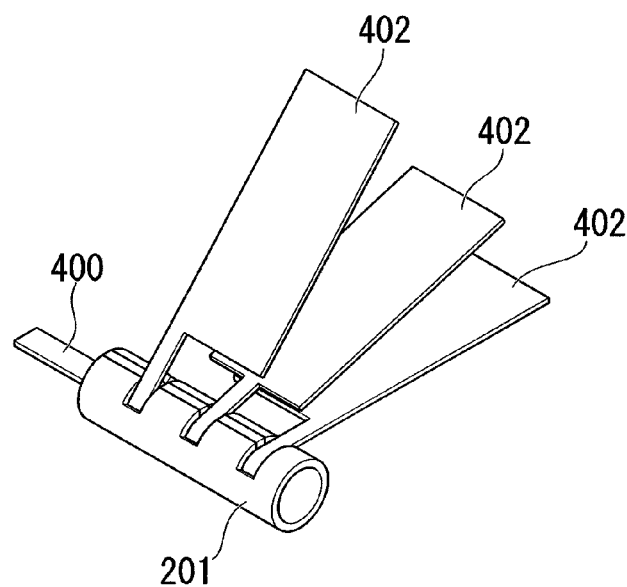
FIG. 4A is a drawing showing a constitution of a hinge and key panels including signal lines of an electric apparatus of one embodiment of the present invention.
Figure 4B:
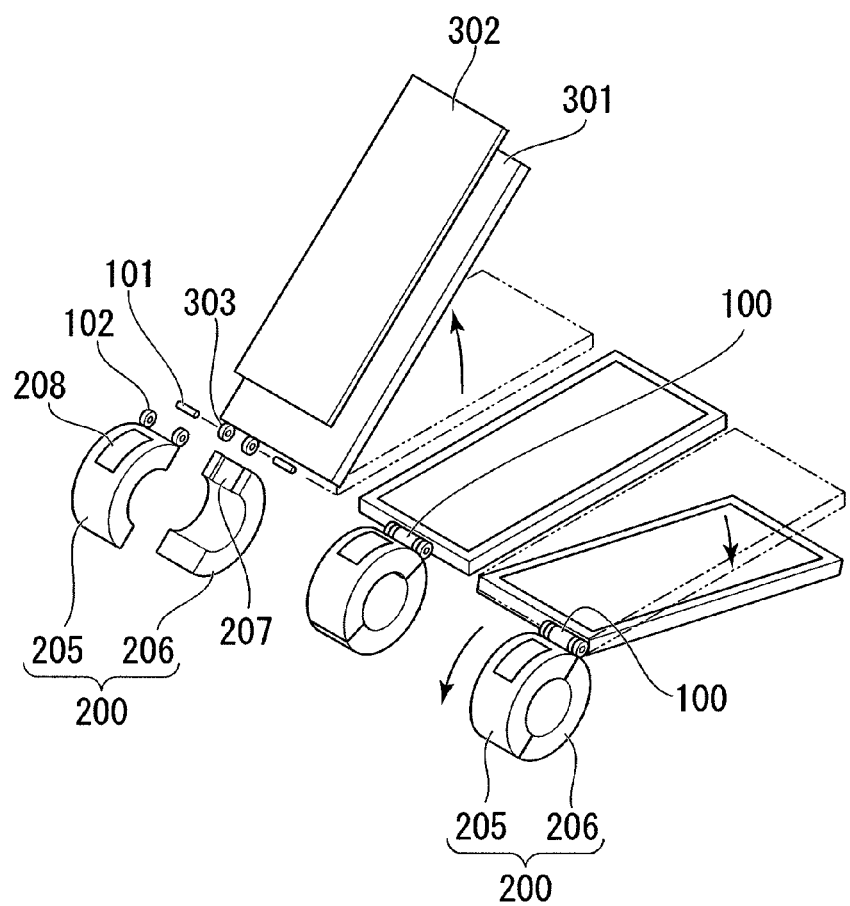
FIG. 4B is a drawing showing a constitution of a hinge and key panels including signal lines of an electric apparatus of one embodiment of the present invention.

FIGS. 4A and 4B show a connection constitution of a signal line which is assigned to each key panel 300 after piercing the hollow rotation central axis 201. The slits 203 are formed in a direction the axis on the hollow rotation central axis 201 because it is not easy to insert the wiring pattern portion 402 of the signal line 400 inside the hollow rotation central axis 201. Through the slits 203, a divided portion of the signal line 400 is arranged at the notch portion 202 corresponding to the second hinge 200 which is connected to each key panel 300. When the arrangement of the divided portion of the signal line 400 is completed, the spacer 203 is set at the slit portion 203. Because the slit 204 is provided, it is possible to avoid the possibility of a breakage due to an edge of the slit 203 when the signal line 400 follows the rotation of the second hinge 200.

Further, if a production method is applied in which a wiring pattern that is formed as an independent piece is adhered afterward as described above in an example of forming the signal line 400, or if a size of a connection portion on a side of the main body of each signal line 400 corresponding to each key panel 300 is sufficiently small to be led through both the hollow rotation central axis portion 201 and the notch portion 202, it is not necessary to provide the slit 203.

Further, the second hinge 200 is constituted from both an upper part portion 205 and a lower part portion 206. Both the upper part portion 205 and the lower part portion 206 surround the hollow rotation central axis 201. Further, the signal line 400 is pulled out thorough a portion between a pair of a first hinge connection portions 102 formed on the upper part portion 205. Here, a pull-out concavity portion 207 for pulling out the signal line 400 is formed on at least one of the upper part portion 205 and the lower part portion 206 of the second hinge. Further, the first hinge connection portion 102 formed on the upper part portion 205 in FIGS. 4A and 4B can be formed on the lower part portion 206. Further, the above-described constitution in which the second hinge 200 is constituted from a pair of portions can be changed if it is possible to arrange the signal line that is rotatably connected.

Further, each wiring pattern portion 402 is fixed to a key panel base 301 which constitutes the key panel 300 corresponding to the wiring pattern portion 402. The wiring pattern portion 402 is sealed by a key panel cover 302. A hinge connection portion 303 arranged at the key panel 301 is connected to the first hinge connection portion 102 formed on the upper part portion 205 of the second hinge 200 by using a connection pin 101. The first hinge 100 is constituted in accordance with such a method.

The first hinge 100 is constituted from the hinge connection portion 303 arranged at a side of the key panel base 301, the first hinge connection portion 102 formed on the upper part portion 205 of the second hinge 200 and the connection pin 101. The connection pin 101 is constituted in a rotatable manner in which the pin 101 is fixed to one of the first hinge connection portion 102 and the hinge connection portion 303.

A pull-out slit for pulling out the signal line 400 is formed on at least one of the key panel base 301 and the key panel cover 302 that constitute the key panel 300. In a similar manner described above, in the first hinge 100, the hinge connection portion 303 can be arranged on at least one of the key panel base 301 and the key panel cover 302 that constitute the key panel 300. In other words, the above-described constitution including the hinge connection portion 303 can be changed if it is possible to arrange the signal line 400 which is rotatably connected.

Figure 5:
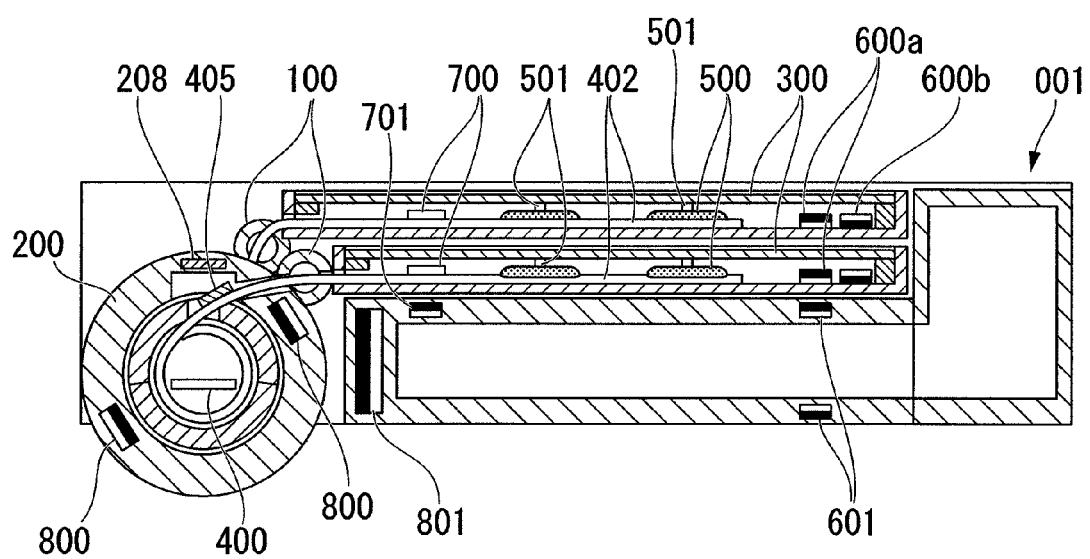
FIG. 5 is a cross-sectional figure showing a constitution of a hinge and key panels including signal lines of an electric apparatus and constitution of the terminal of one embodiment of the present invention.

FIG. 5 is a cross-sectional figure showing the first hinge 100, the second hinge 200 and the laminated key panels 300 to which the above-described connection method of the signal line is applied. In this cross-sectional figure, a pair of the key panels 300 is laminated.

A wiring pattern (not shown in the drawings) for detecting key operations is formed on the wiring pattern portion 402 which is formed on the signal line 400, and metal domes 500 are arranged at positions corresponding to key switches. A pressure transmission member 501 is arranged between the metal dome 500 and a portion which is a key, and these constitutional elements are similar to those of a membrane switch that is generally known today. Further, an illumination of the key portion is a generally used technique as well, and the same constitution is mounted on the key panel 300. Such a constitution is generally used in the art, and explanations thereof are omitted.

The multiple key panels 300 have panel fixing magnets 600 that are set at positions substantially overlapping each other when laminating the multiple key panels 300. Such panel fixing magnets 600 are constituted from a pair of panel fixing magnets 600a and 600b including opposite polarities. A positional relationship between the panel fixing magnet 600a and 600b is designed in a manner in which, when the user would like to pull up the key panel 300 in a laminated state by rotating the second hinge 200 corresponding to the desired key panel 300 at an angle of approximately 10-30 degrees, a repulsion generated by a magnetic power is caused between the panel fixing magnet 600a arranged at a lower side surface of the laminated layer which is the key panel 300 and the panel fixing magnet 600b of the other key panel 300 which is arranged under the prior key panel 300.

Further, a main body side panel fixing magnet 601 is arranged at a portion of the chassis of the main body that touches the key panel 300. Therefore, when the key panels 300 are completely closed or returned, the key panel 300 is attracted or pulled by the chassis of the main body. When the key panel 300 is opened at an angle of 10-30 degrees, there is a repulsion force between the panel fixing magnet 600b of the key panel 300 and the main body side panel fixing magnet 601.

A magnetic sensor 700 is arranged at the wiring pattern portion 402 of each key panel 300. When the key panel 300 is closed so as to be on a front surface or the terminal main body 001, the magnetic sensor 700 detects a state detection magnet 701 arranged at the main body chassis 001 and detects that the key panel 300 is closed.

Further, second hinge rotation fixing magnets 800 are included at two portions inside the second hinge 200, and a main body side rotation fixing magnet 801 corresponding to the second hinge rotation fixing magnets 800 is arranged at a side of the main body chassis. A menu icon 208 through which the light can be transmitted is formed at a portion of a rotation cylinder of the second hinge 200. A light emission element 405 is arranged on a signal line which is close to the menu icon 208.

One embodiment is proposed as described above. Other than the above described embodiment, it is obvious that it is possible to apply materials other than a flexible cable to the portions of the signal line 400 except for the wiring pattern portion 402, and it is possible to apply an electrical connection method to a connection between the signal line 400 and the wiring pattern portion 402.

Hereinafter, a constitution of a control system is described which detects a state of the key panel 300 and conducts a control operation in accordance with the state of the key panel 300. Multiple key panels 300 transmit/receive signals to/from the terminal main body 001 via the signal lines 400. The terminal main body 001 has a device control portion 750 which receives information from the magnetic sensor 700 arranged at each key panel 300 and which conducts a control operation in accordance with the state of each key panel. Further, the device control portion 750 controls the light emission element and other interface (devices, for example, screen, sound, microphone, vibration, external interface, wireless, pointing device and various sensors).

[Descriptions of Operations]

Hereinafter, in reference to FIGS. 1A-6, operations of an electric apparatus of this embodiment are explained in detail.

The signal line 400 functions as a connection line of signals between the device control portion 750 inside the terminal main body 001 and the key panels 300 and is used for controlling each of multiple key panels 300. The signal lines 400 have a connection constitution by using flexible signal lines to have durability against repeated rotation operations by the first hinge 100 and the second hinge 200. In particular, in this embodiment, the second hinge 200 has a rotation angle which is larger than 180 degrees, and due to this, a portion of the signal line 400 which passes through the hinge portion 200 has a winded shape. In such a manner in which a curvature of the winded signal line 400 is changed in response to changes of the rotation angle of the second hinge 200, repeated stress is decreased, and durability is increased.

This embodiment has a constitution in which the signal line 400 lead from the terminal main body 001 pierces through the second hinge 200 and is sandwiched between a key panel base 301 of the key panel 300 and the key panel cover 302 after passing through the first hinge portion 100. It is necessary for the signal line 400 to change shapes in accordance with a rotation of the first hinge portion 100. A range of angles when the shape of the first hinge 100 is changed is, for example, approximately ±50 degrees. The first hinge portion 100 has a comparatively small rotation angle as compared to the second hinge portion 200 and causes comparatively small stress on the signal line 400.

A constitution of the membrane switch arranged on the signal line 400 on a side of the key panel 300 shown in FIG. 5 is generally applied to, for example, a cellular phone, functions and operations of such a membrane switch are generally known as well, and therefore, explanations of the membrane switch are omitted.

Figure 6:
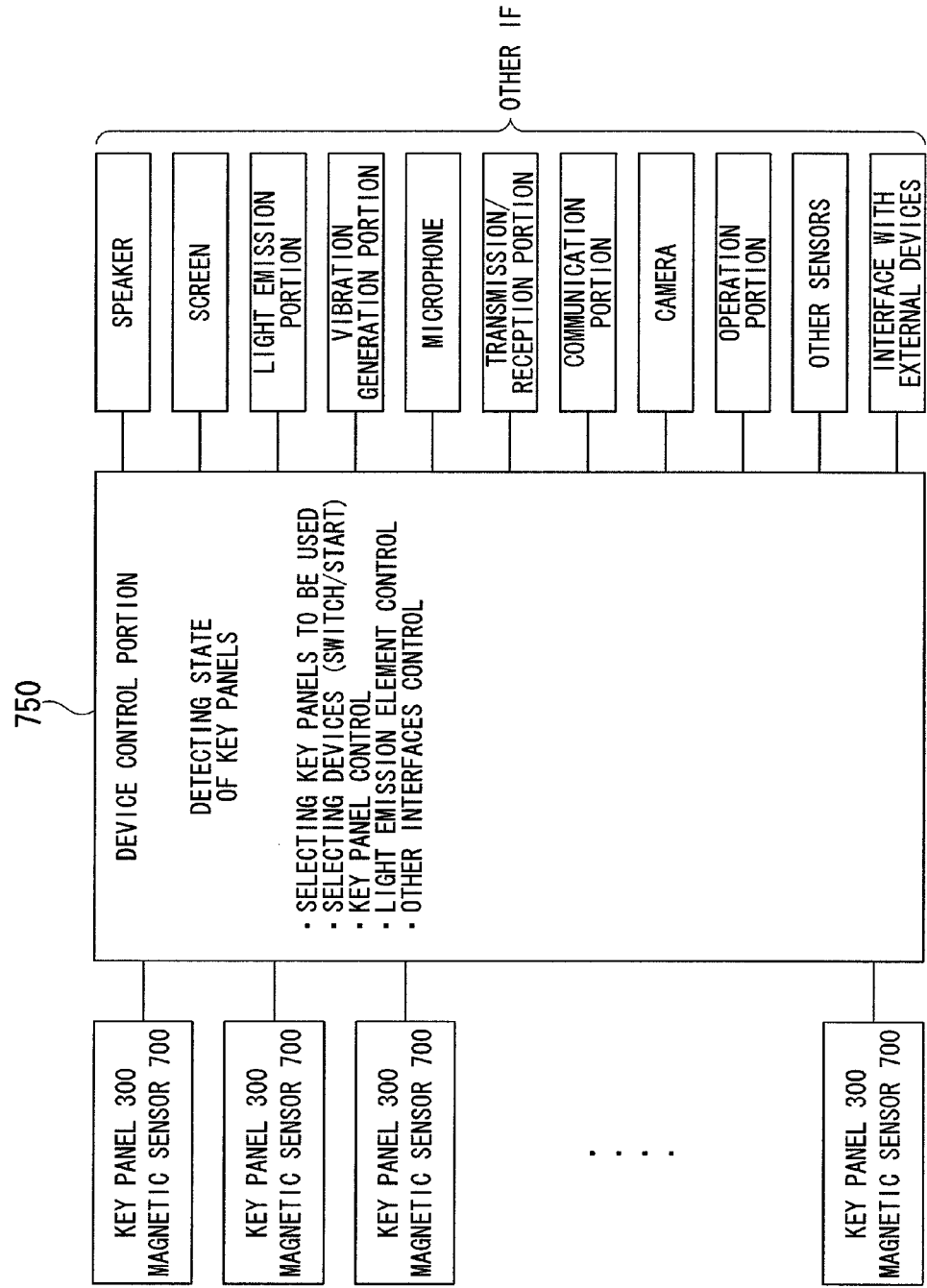
FIG. 6 is a block diagram showing a control system of an electric apparatus of one embodiment of the present invention.

Here, operations of both the magnetic sensor 700 arranged on the wiring pattern portion 402 and the state detection magnet 701 arranged at a side of the terminal main body 001 are explained. When the key panels 300 are closed on the terminal main body and are in a laminated state, the magnetic field of the state detection magnet 701 is detected by the magnetic sensor 700 arranged at each key panel, and the magnetic sensor 700 generates information. The magnetic sensor 700 transmits the information to the device control portion 750 as shown in FIG. 6. In accordance with the information received form the magnetic sensor 700, the device control portion 750 selects the key panel 300 (single panel or multiple panels) that is going to be used, conducts a switching operation or a start operation of functions that are going to be used, checks the state of other interfaces, and conducts control operations of, for example, selecting the key panel 300 which is going to be used. The device control portion 750 controls the key panel 300 and controls switch-on/off of the light emission element 405 right below the menu icon 208 if necessary.

Regarding operations of the key panels 300, for example, the key panel 300 which faces the terminal main body 001 and which is laminated at the heist layer is moved and rotated by the user, the state of the magnetic sensor 700 mounted on the key panel 300 is changed. The amount of such change is transmitted to the device control portion 750. The control portion 750 controls the screen, sound, vibration and other devices in a harmonized or synchronous manner in accordance with the successively changing information transmitted from the magnetic sensor 700. Further, it is possible for the control portion 750, for example, to switch functions and/or to start another function when the information transmitted from the magnetic sensor 700 is higher than a threshold. Further, for example, the control portion 750 commands to show an operation of turning a page of a book on the screen in accordance with the amount of changes of the information transmitted from the magnetic sensor 700, and it is possible to improve operational feeling with reality by synchronizing and/or harmonizing both the image on the screen and an actual operation on the key panel 300.

Here, in reference to FIG. 5, a holding method is explained when each key panel 300 is closed on the terminal main body 001 in a laminated state. The main body side panel fixing magnet 601 arranged on an upper portion of the terminal main body 001 and the panel fixing magnet 600a of the key panel 300 which is the closest key panel from the terminal main body 001 are in a relationship of being attracted to each other. In a similar manner, the panel fixing magnets 600a/b of the key panel which is secondary laminated key panel (that is, arranged at the top in FIG. 5) and the panel fixing magnets 600a/b of the lower key panel 300 are in a relationship of being attracted to each other. If there are 3 or more key panels 300, such a relationship is the same up to the key panel 300 at the highest place. Here, a case of rotating the key panel 300 at the highest place is explained. When the cylindrical portion of the second hinge 200 corresponding to the key panel 300 at the highest place is rotated at approximately 10-30 degrees in a direction the key panel is moved, positions of the panel fixing magnets 600a and b arranged at the laminated key panel 300 are slightly moved over or slipped. Here, due to the positions of the magnets, both the panel fixing magnet 600b of the key panel 300 which is moved and the panel fixing magnet 600a of the key panel 300 arranged below react with each other. Both of them are arranged in directions so as to bounce, and the key panel 300 which is moved is popped up due to the reacting force. Therefore, a pickup slit or a gap for paging or opening the key panel 300 by the user appears.

Further, rotation of the key panel 300 at the bottom is conducted in a similar manner, and when the key panel 300 at the bottom is rotated at approximately 10-30 degrees in a direction for opening the key panel 300, positions of the panel fixing magnets 600a and b arranged at the laminated key panel 300 are slightly moved over or slipped. Then, both the main body side panel fixing magnet 601 and the panel fixing magnet 600b of the key panel 300 react each other. Both of them are arranged in directions so as to bounce, and the key panel 300 is popped up due to the reacting force. It is possible to arrange other main body side panel fixing magnet 601 on a backside surface of the terminal main body 001 so as to achieve the same operation state as described above when all key panels 300 are opened and are laminated on the backside surface of the terminal main body 001.

Further, both the second hinge rotation fixing magnet 800 arranged at the second hinge 200 and the main body side rotation fixing magnet 801 arranged at a position where the magnetic power affects the second hinge 200 from the terminal main body 001 attract each other. Due to this, when being at a certain rotation angle, the second hinge receives a force that attracts in a predetermined direction. It is possible to maintain a closed state of the key panels 300 on the terminal main body 001 by using such an attracting force. Further, there is another way of using such attracting force in that a rotation of the key panels 300 can be stopped at a predetermined position. Such a function described above has usability, for example, when keys are arranged on both sides of the key panels, and when both a front surface of one of two key panels 300 and a backside surface of the other key panel 300 are kept in a spread state.

Embodiment 2

FIGS. 7A-8B are cross-sectional figures showing a constitution of other embodiment.

Figure 7A:
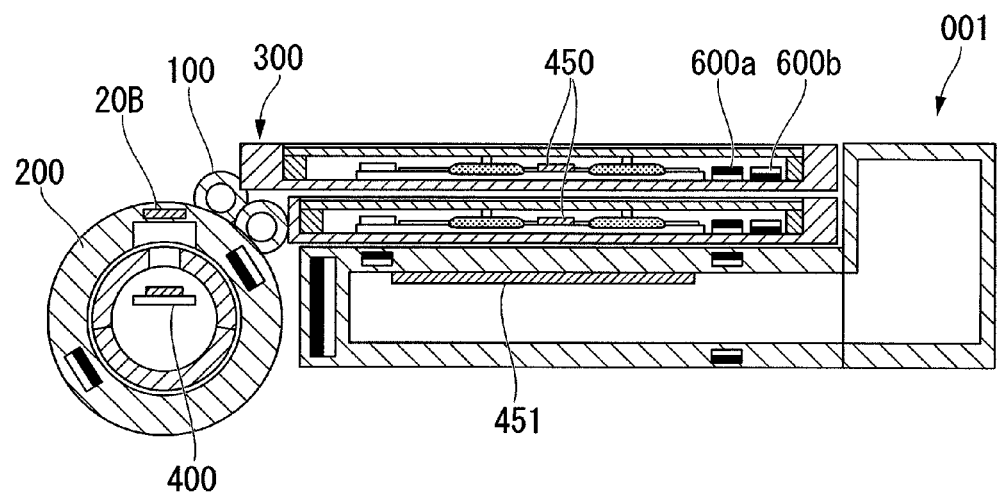
FIG. 7A is a cross-sectional figure showing a constitution of other embodiment of the present invention.

This embodiment has the same basic constitution as the Embodiment 1. FIG. 7A shows a constitution in which the signal line 400 of each key panel is wirelessly connected. In FIG. 7A, the terminal main body 001 has a wireless reading means 451 for reading or receiving information transmitted from wireless transmission means 450 which are arranged at the key panels 300. The wireless reading means 451 transmits the information regarding key operations to the device control portion 750 (for example, see FIG. 6) of the terminal main body 001 via the radio waves. The key panels 300 of such constitution are considered to use, for example, the same method as reading information of an RFID (Radio Frequency IDentification). In such a case, it is not necessary to supply the key panels 300 with the electric power for transmitting the operation information of the key panels 300, and it is not necessary to arrange the electric power at the key panels 300 for transmitting the operation information of the key panels 300. However, in such a case, it is not possible to supply power for the illumination of the key buttons. Recently, this has been resolved by using a technique of wirelessly transmitting the electric power from the main body to the key panels 300.

Figure 7B:
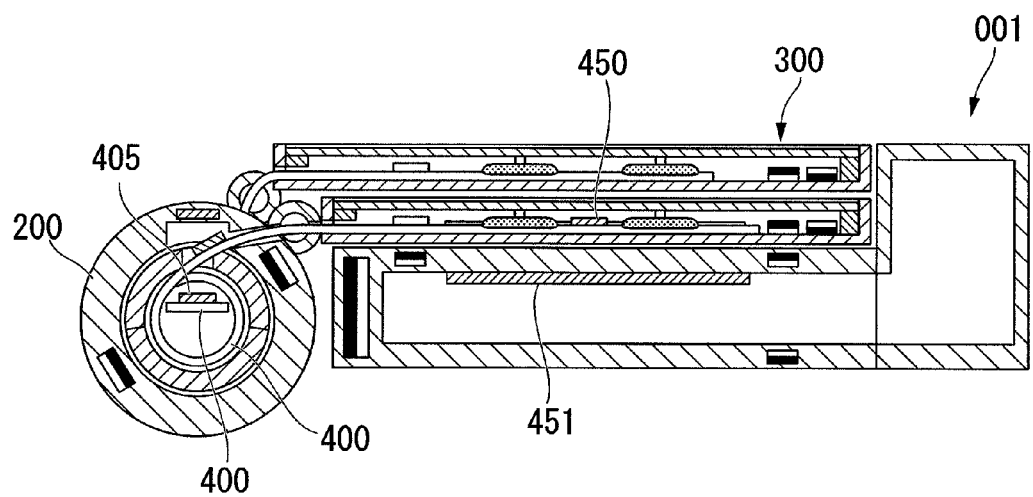
FIG. 7B is a cross-sectional figure showing a constitution of other embodiment of the present invention.

FIG. 7B shows a constitution in which the key panels 300 are respectively connected via the signal lines 400, and the wireless transmission means 450 is arranged at only the key panel 300 which is the closest to the terminal main body when the key panels 300 are closed on the front surface of the terminal main body 001. The wireless reading means 451 is arranged at the terminal main body 001 for reading or receiving the information from the wireless transmission means 450 arranged at the key panels 300. In accordance with such a constitution, it is possible to transmit the information regarding key operations to the device control portion 750 of the terminal main body 001 via radio waves (for example, see FIG. 6).

Figure 8A:
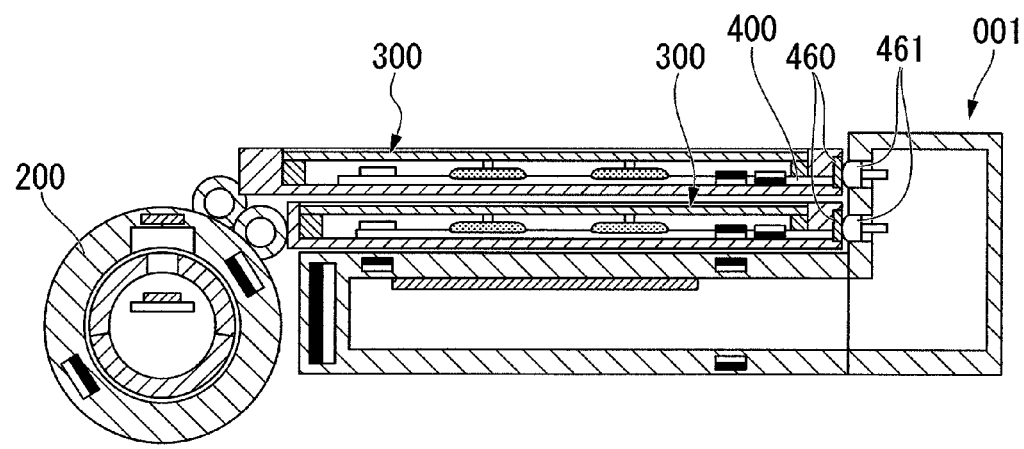
FIG. 8A is a cross-sectional figure showing a constitution of other embodiment of the present invention.
Figure 8B:
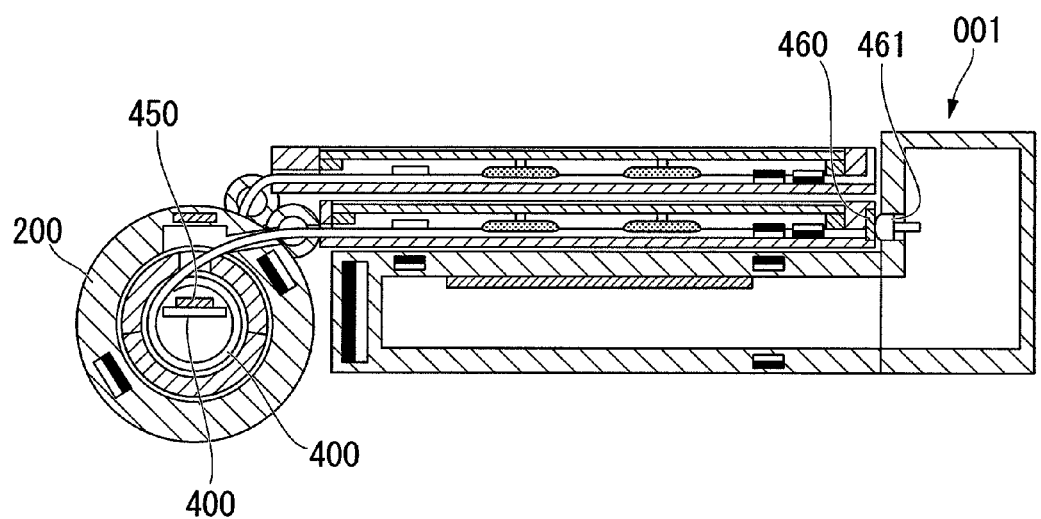
FIG. 8B is a cross-sectional figure showing a constitution of other embodiment of the present invention.
Figure 9:
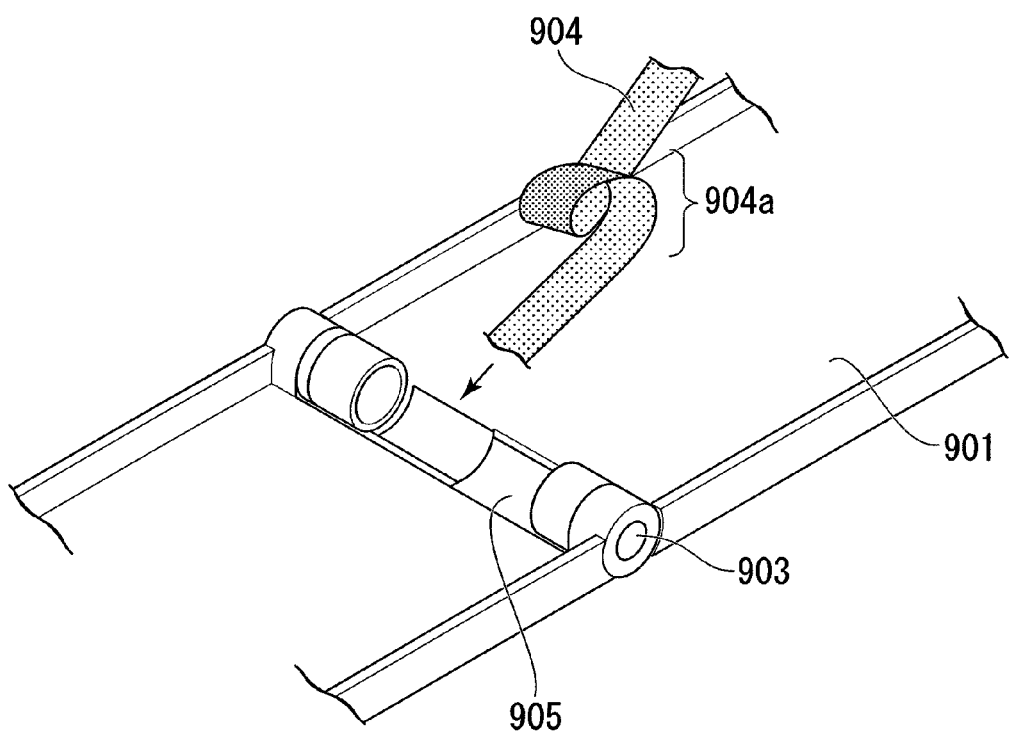
FIG. 9 is a perspective drawing showing a constitution of connection of signal lines in a prior art.
Figure 10A:
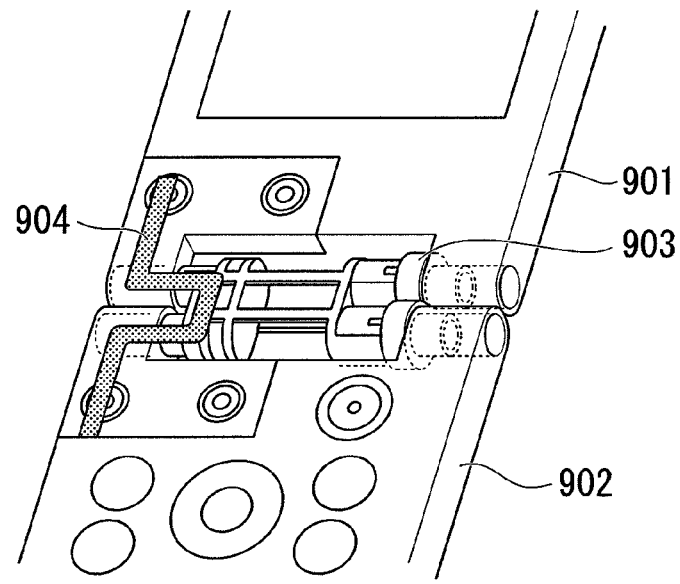
FIG. 10A is a perspective drawing showing a constitution of connection of signal lines in other prior art.
Figure 10B:
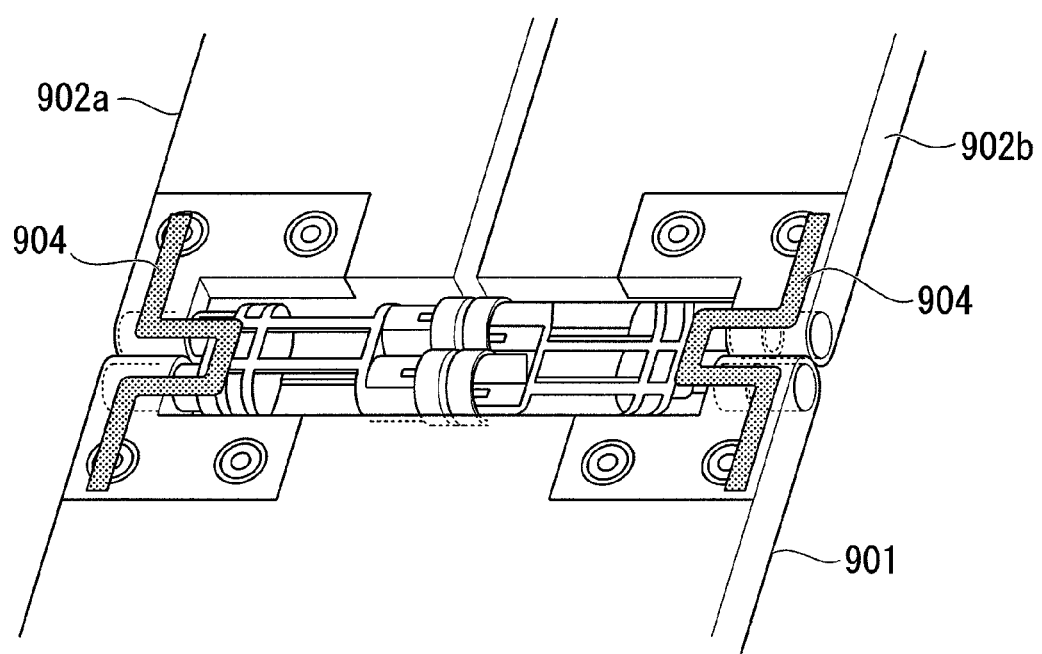
FIG. 10B is a perspective drawing showing a constitution of connection of signal lines in other prior art.

Further, in other embodiment, FIG. 8A shows a constitution in which the signal line 400 of each key panel is connected by using both a panel terminal 460 arranged at an end of each key panel 300 and a main body side terminal 461 of the terminal main body 001 corresponding to the panel terminal 460. FIG. 8B shows a constitution in which the key panels 300 are connected via the signal lines 400, the panel terminal 460 is arranged at only the key panel 300 which is the closest to the terminal main body when the key panels 300 are closed on the front surface of the terminal main body 001, and the main body side terminal 461 corresponding to the panel terminal 460 is arranged at the terminal main body 001. The panel terminal 460 touches the main body side terminal 461 only when the key panels 300 are closed. In accordance with such a constitution, via the panel terminal 460 arranged at an end of the key panel 300 and the main body side terminal 461 corresponding to the panel terminal 461, it is possible to transmit the information regarding key operations the device control portion 750 (for example, see FIG. 6) of the terminal main body 001 via the radio waves.

It should be noted that in both cases described above in which the key panels 300 and the terminal main body 001 are connected via the radio waves and in which the key panels 300 and the terminal main body 001 are connected via connection terminals, examples in which the key panels 300 are connected via the signal line 400 have advantage in that it is possible to use key panel 300 which is not closed or arranged on the terminal main body when a pair of key panels 300 are used in a spread state. Further, it is possible to arrange a touch panel, a touch a sensor and other display devices in place to the key panel.

Further, when the signals from each key panel 300 are wirelessly transmitted, it is possible to omit a portion of the terminal main body 001 on which the key panels are laminated and to use the key panels which are infinitely rotatable. Due to this, it is possible to realize an interface which can be operated in the same manner as a real book, for example, turning a page in a forward direction and backward direction.

INDUSTRIAL APPLICABILITY

There are usage examples of the present invention applied to general electric devices, for example, a cellular phone, a PDA and a notebook PC.

DESCRIPTION OF THE REFERENCE SYMBOLS

001 . . . terminal main body
100 . . . first hinge
101 . . . connection pin
102 . . . first hinge connection portion
200 . . . second hinge
201 . . . hollow rotation central axis
202 . . . notch portion
203 . . . slit
204 . . . spacer
205 . . . second hinge upper part portion
206 . . . second hinge lower part portion
207 . . . pull-out concavity portion
300 . . . key panel
301 . . . key panel base
302 . . . key panel cover
400 . . . signal line
401 . . . division portion
402 . . . wiring pattern portion
403 . . . connection portion
405 . . . light emission element
450 . . . wireless transmission means
451 . . . wireless reading means
460 . . . panel terminal
461 . . . main body side terminal
500 . . . metal dome
501 . . . pressure transmission member
600 . . . panel fixing magnet
601 . . . main body side panel fixing magnet
700 . . . magnetic sensor
701 . . . state detection magnet
800 . . . second hinge rotation fixing magnet
801 . . . main body side rotation fixing magnet

The invention claimed is:

1. An electric apparatus comprising a plurality of key panels with operation surfaces on which keys are arranged facing in one direction, wherein
one end of each of said plurality of key panels is connected to a terminal main body via both a first hinge which has a rotatable connection and a second hinge which is in parallel with the first hinge and which has rotatable connection,
said plurality of key panels have constitution in which the second hinges are arranged in a line along a direction of a rotation central axis thereof, and
a signal line, which transmits operation information form the terminal main body to each of said plurality of key panels, pierces the rotation central axis which is hollow of the second hinges, is divided at a point corresponding to the first hinge of each of said plurality of key panels, and is connected to both the first hinge and inside of a chassis of each of said plurality of key panels via a notch portion on a rotation central axis cylindrical portion of the second hinge that is arranged at a point corresponding to the first hinge.

2. The electric apparatus according to claim 1, wherein the rotation central axis cylindrical portion which is hollow comprises a slit in an axis direction.

3. The electric apparatus according to claim 1, wherein the signal line is a flexible cable.

4. The electric apparatus according to claim 1, wherein the signal line is a fine coaxial line.

5. The electric apparatus according to claim 1, wherein the signal line is a discrete line.

6. The electric apparatus according to claim 1, wherein
said plurality of key panels comprises a means for wirelessly transmitting key operation information,
the terminal main body comprises a means for reading wireless transmission information from the key panels, and
the electric apparatus comprises a key panel selection portion which detects state of said plurality of key panels that are laminated and switches the key panels that are usable based on the state thereof.

7. The electric apparatus according to claim 6, wherein
all or a predetermined number of said plurality of key panels are connected to each other via the signal line, and
only the key panel which is the closest to the terminal main body among said plurality of key panels that are laminated has the means for transmitting the key operation information.

8. The electric apparatus according to claim 1, wherein
each of said plurality of key panels comprises a terminal for electrical connection at a portion where the first hinge is not arranged, and
the terminal main body comprises a terminal for electrical connection at a position corresponding to the terminal of the key panel.

9. The electric apparatus according to claim 8, wherein
all or a predetermined number of said plurality of key panels are connected to each other via the signal line, and
only the key panel which is the closest to the terminal main body among said plurality of key panels that are laminated has the terminal for electric connection to transmit key operation information.

10. The electric apparatus according to claim 1 further comprises a conversion means which converts operation information of the key panels to a physical quantity which is one of electromagnetic wave, light, force and vibration, wherein
the terminal main body comprises detection means for detecting the physical quantity.

11. The electric apparatus according to claim 1, wherein keys are arranged on both sides of said key panels.

12. The electric apparatus according to claim 1, wherein touch panels or touch sensors are arranged in place to the key panels.

13. The electric apparatus according to claim 1, wherein display devices are arranged in place to the key panels.

14. An electric apparatus comprising a plurality of key panels with operation surfaces on which keys are arranged facing in one direction, wherein
one end of each of said plurality of key panels is connected to a terminal main body via a second hinge,
said plurality of key panels have constitution in which the second hinges are arranged in a line along a direction of a rotation central axis thereof, and
a signal line which transmits operation information form the terminal main body to each of said plurality of key panels pierces the rotation central axis which is hollow of the second hinges, is divided at a point corresponding to each of said plurality of key panels, and is connected to inside of a chassis of each of said plurality of key panels via a notch portion on a rotation central axis cylindrical portion of the second hinge that is arranged at a point corresponding to each of said plurality of key panels.

* * * * *

UNITED STATES PATENT AND TRADEMARK OFFICE
CERTIFICATE OF CORRECTION

PATENT NO. : 8,472,173 B2  
APPLICATION NO. : 13/146146  
DATED : June 25, 2013  
INVENTOR(S) : Mitsuru Sendoda Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 152 days.

Signed and Sealed this
Eighth Day of September, 2015

Michelle K. Lee
*Director of the United States Patent and Trademark Office*